United States Patent [19]
Adolph et al.

[11] Patent Number: 5,920,675
[45] Date of Patent: Jul. 6, 1999

[54] FAST SEARCH OPERATION IN A FILM PLAYBACK DEVICE

[75] Inventors: Dirk Adolph, Ronnenberg; Ingo Huetter, Celle, both of Germany

[73] Assignee: Deutsche Thomson-Brandt GmbH, Germany

[21] Appl. No.: 08/733,423

[22] Filed: Oct. 18, 1996

[30] Foreign Application Priority Data

Nov. 18, 1995 [DE] Germany ............... 195 43 017

[51] Int. Cl.[6] ............... H04N 5/91; H04N 5/917
[52] U.S. Cl. ............... 386/68; 386/109
[58] Field of Search ............... 386/68, 67, 109, 386/111, 112, 6, 33, 27; 360/72; H04N 5/91, 5/917

[56] References Cited

U.S. PATENT DOCUMENTS

| | | | |
|---|---|---|---|
| 4,312,017 | 1/1982 | Poetsch | 358/214 |
| 4,346,408 | 8/1982 | Massmann | 358/214 |
| 4,476,549 | 10/1984 | Poetsch et al. | 358/214 |
| 4,496,990 | 1/1985 | Dyfverman | 358/310 |
| 4,524,392 | 6/1985 | Poetsch | 358/214 |
| 5,121,218 | 6/1992 | Miyake et al. | 358/337 |
| 5,319,500 | 6/1994 | Yu | 360/10.3 |
| 5,371,532 | 12/1994 | Gelman et al. | 348/7 |
| 5,377,051 | 12/1994 | Lane et al. | 386/68 |

FOREIGN PATENT DOCUMENTS 0676898  3/1995  European Pat. Off. ....... H04N 7/173

*Primary Examiner*—Robert Chevalier
*Attorney, Agent, or Firm*—Joseph S. Tripoli; Joseph J. Laks; Francis A. Davenport

[57] ABSTRACT

A method for the production of picture sequences for a fast search operation in a film play-back device (10, 40) is proposed. In this case, the video data of the individual pictures of the film are stored in digitally coded form in a storage unit (11, 41). The method is distinguished by the fact that 1. the video data of the pictures are read out from the storage unit (11, 41) at an increased speed, that 2. the read-out video data are decoded at an increased speed in a decoder (18, 43), that 3. only the video data of specific individual pictures are selected from the decoded video data and are fed to an encoder (21, 45) which operates at a regular speed.

9 Claims, 4 Drawing Sheets

FAST SEARCH OPERATION IN A FILM PLAYBACK DEVICE

BACKGROUND OF THE INVENTION

The invention relates to a method for the production of picture sequences for a fast search operation in a film playback device. So-called Video-on-demand services (VOD) are currently being developed, in the case of which the user of a television set is coupled via a return channel to a provider of Video-on-demand services. By this means he can request selected broadcasts and/or films. The selected film is then transmitted from the VOD service provider to the subscriber via a corresponding data transmission channel.

The user of this service also frequently requires so-called trick modes. These trick modes relate to a fast search in the forward direction and in the backward direction, a pause function as well as a slow-motion function. These trick modes are also known from conventional video recorders. The request for a trick mode is then effected, for example, using the remote control of the television set and is transmitted via the return channel to the provider of the VOD service. While the trick modes pause and slow motion are relatively easy to implement, for this it being necessary to transmit the last decoded picture continually or repeated a number of times, the trick modes fast forward run and reverse run are more difficult to implement.

The object of the invention is to make such trick mode services available in the case of VOD service providers and film playback devices. This object is achieved by claim 1. The VOD service providers use so-called video servers for making the selectable programmes and films available. A video server essentially consists of one or a number of hard disks on which the video data are stored. For this purpose, the video data are, for example, digitally coded according to the MPEG Standard (Moving Picture Experts Group) MPEG1 or MPEG2 known from the prior art.

In order to achieve the necessary high data compression, the individual pictures of a sequence are coded differently in accordance with the MPEG2 Standard. A distinction is made between intra-coded pictures (I frames), unidirectionally predicted pictures (P frames) and bidirectionally predicted pictures (B frames).

However, the intra-coded pictures require a greater storage capacity on the hard disk than the unidirectionally or bidirectionally predicted pictures. The intra-coded pictures can be decoded independently of preceding or succeeding pictures, but the preceding intra-coded or unidirectionally predicted picture is required for the decoding of unidirectionally predicted pictures. Both the preceding intra-coded or the unidirectionally predicted picture and the succeeding intra-coded or unidirectionally predicted picture are required for the bidirectionally predicted pictures. The sequence of the I-, P- and B-coded pictures is freely adjustable to a large extent in accordance with the MPEG1 or MPEG2 Standard. However, it has been shown in the past that a scheme is advantageous in which three unidirectionally coded pictures follow an intra-coded picture and two bidirectionally coded pictures should be stored between in each case two unidirectionally coded pictures and between an intra-coded picture and a unidirectionally coded picture. This sequence is illustrated in FIG. 7. Such a sequence comprising 12 frames is constantly repeated during recording, typically approximately every 0.5 seconds.

In order to realize a fast forward run in the case of pictures coded in accordance with the MPEG Standard, a technique such as is known from analog video recorders can no longer be applied, on account of the great data compression. A possible solution in which, for example, an increase in the playback speed by a factor of 12 would be achieved by transmitting only the intra-coded pictures to the user also encounters difficulties, since most of the bits when coding video sequences are required for coding the intra-coded pictures. If, therefore, it was desired to transmit only the intra-coded pictures in the case of such a fast forward run, then it is no longer possible with the available broadband cables and desired numbers of channels, on account of the number of bits per picture, where the number of bits is far above the average in the case of these pictures.

Another possible method would be to use a second bit stream as well as the bit stream, produced in accordance with the MPEG Standard, for the regular playback speed, which second bit stream has been obtained from a sequence which has already been subsampled in the time domain, and additionally to store the said second bit stream on the storage medium. A switch could then be made to this bit stream in the event of a desire for a fast forward run. However, this method would have the disadvantage that additional storage space would be used up for a service which would probably be used relatively rarely.

SUMMARY OF THE INVENTION

In contrast, the method according to the invention, having the characterizing features of the independent claim, has the advantage that the abovementioned trick modes (fast forward run, fast reverse run, pause and slow motion) can be achieved with a tenable outlay. In particular, it is possible to be able to offer a fast forward run or fast reverse run at to a large extent any desired speeds. It is possible to realize not just individual selected speeds such as three-fold or twelve-fold, but also five-fold, nine-fold or ten-fold, etc. It is furthermore advantageous that trick modes realized in this way produce a very good picture quality.

Advantageous developments and improvements of the method specified in the main claim are possible by virtue of the measures cited in the subclaims. The measure in accordance with claim 4, according to which the decoded video data of a specific number of pictures are buffered and subsampled backwards, is particularly advantageous. This enables the trick mode function "fast reverse run".

Advantageous measures are cited in claims 8 and 9 for an apparatus for carrying out the method. The method according to claims 10 and 11 affords the advantage that it can be realized very easily in a film playback device (for example videodisk player). However, it makes available only restricted forward run and reverse run speeds.

BRIEF DESCRIPTION OF THE DRAWINGS

Exemplary embodiments of the invention are explained in more detail below and are illustrated in the drawings, in which.

DESCRIPTION OF THE PREFERRED EMBODIMENT

Figure 1:
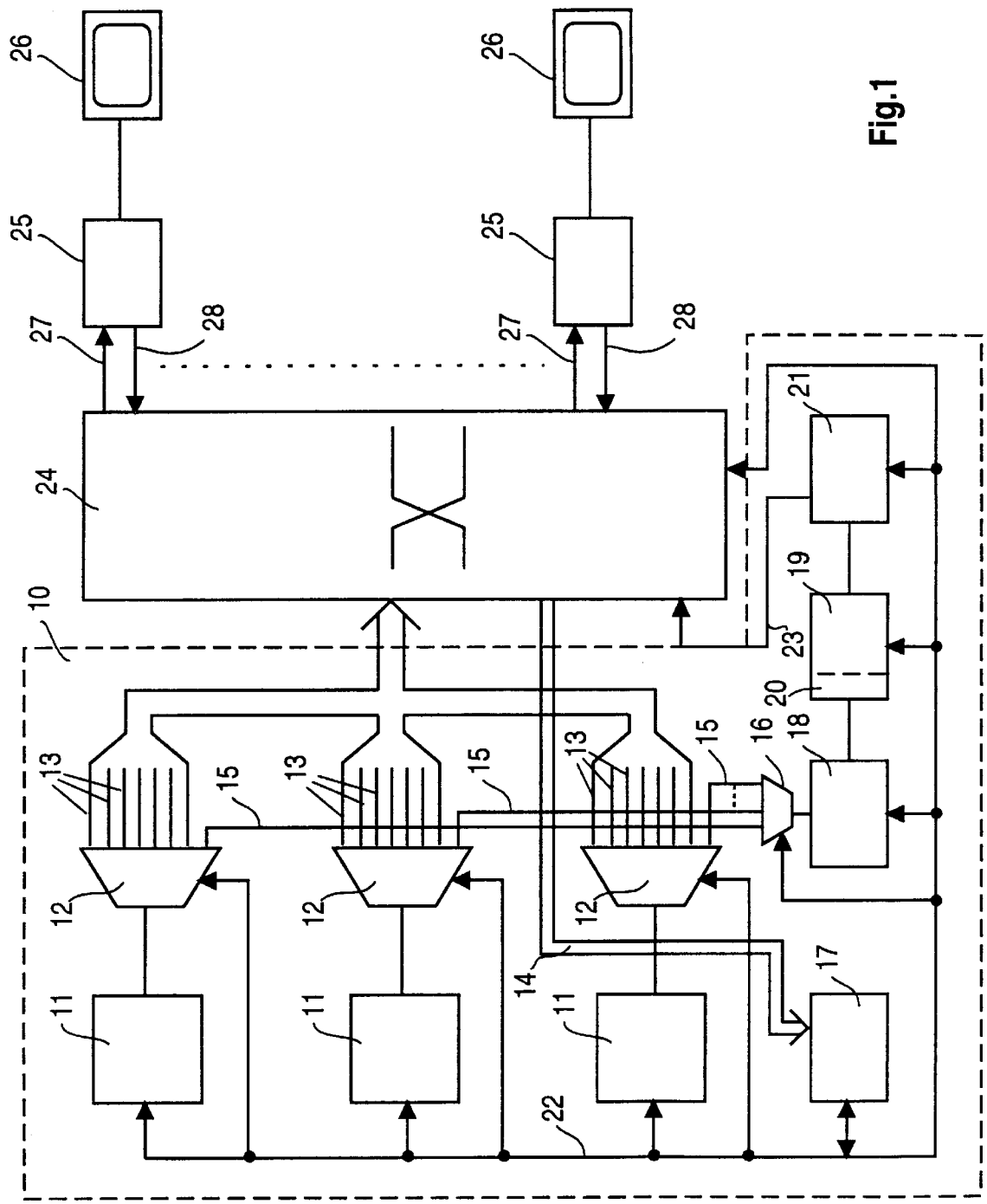
FIG. 1 shows a block diagram of the entire arrangement for realizing VOD services, including the provision of trick modes.

In FIG. 1, the reference number 10 designates all the components which are required by the VOD service provider in order to realize the method according to the invention. These components are explained in more detail below. The reference number 26 designates television sets. These are used by different users. The reference number 25 designates decoding units, which are also known under the more familiar name "set-top box". The reference number 27 designates data channels which transport the video data from the VOD service provider to the respective user. The reference number 28 likewise designates data channels. These data channels transport data in the opposite direction, from the respective user to the VOD service provider. In the following text, the data channels 27 are referred to as forward channel and the data channels 28 as return channel. The reference number 24 designates a switching matrix. This switching matrix 24 switches between the individual data channels 13 present on the input side and the data channels 27 connected on the output side. The switching matrix 24 therefore corresponds, for example, to an exchange such as is sufficiently known from the prior art. An ISDN switching system is cited as an example.

The reference number 11 designates hard disks having a very large capacity. The individual television programmes and/or video films which are offered are stored on these hard disks. In this case, a plurality of films and/or programmes are stored on a single hard disk. In the exemplary embodiment illustrated, seven different programmes and/or video films are stored on each hard disk. The data transfer rate of the individual hard disks is very high, with the result that the hard disks 11 can, after a time-division multiplex process, make the data of the offered films and/or programmes available to a demultiplexer 12. The demultiplexers 12 are designed in such a way that they each assign the data present at their input to the correct data channel 13 at the correct point in time. Of course, by this means the same data can also be applied to a plurality of data channels 13. The individual data channels 13 are shown combined in FIG. 1 and end in a parallel bus. However, this serves only to simplify the illustration. The individual data channels 13 are still present separately and also pass separately to the switching matrix 24.

A parallel or serial bus 14 is routed from the switching matrix 24 to a control unit 17. The parallel bus 14 consists of the individual return channels 28. The service requirements of the users therefore arrive in the control unit 17. Based on the requirements that have arrived, the control unit 17 controls the switching matrix 24 via a serial bus 22. What it communicates, in particular, to the switching matrix 24 is which data channel 27 is to be connected to which data channel 13.

In order to realize trick modes, a special data line 15 is connected to each demultiplexer 12. These data lines 15 lead to a multiplexer 16. The output of the multiplexer 16 is connected to a decoder 18. If the data are stored on the hard disks 11 in accordance with the MPEG Standard, the decoder 18 is likewise an MPEG decoder. However, this decoder has the special feature that, under the control of the serial bus 22, it operates at a higher speed than the decoding unit 25 in the regular playback mode. However, this will be discussed more extensively below. The reference number 19 designates a subsampling unit. This contains a buffer 20. The subsampling unit 19, too, is controlled by the control unit 17 via the serial bus 22. For its part, the subsampling unit 19 is connected to an encoding device 21. The encoding unit 21 also operates in accordance with the MPEG1 or 2 Standard. However, it operates at the same operating speed as do the decoder devices 25 in the normal playback mode. The data coded in this way are fed to the switching matrix 24 via a further data channel 23.

Furthermore, the hard disks 11 as well as the demultiplexer devices 12 and also the multiplexer device 16 are controlled via the serial or parallel bus 22.

Figure 3:
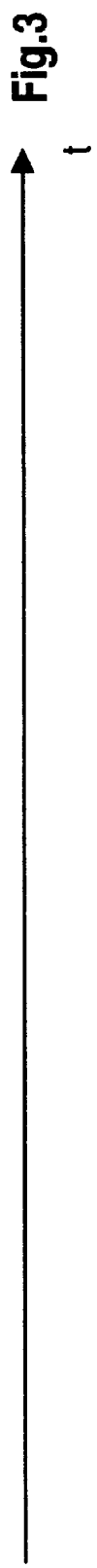
FIG. 3 shows a diagrammatic illustration for explaining the method according to the invention, in which a fast forward run at a playback speed which has been increased two-fold is illustrated.

The method of operation of the arrangement according to FIG. 1 will be explained below in conjunction with FIG. 3. FIG. 3 illustrates the case where one of the users of the VOD service has transmitted the request for the rapid search (forward run) to the control unit 17 via the return channel 28 assigned to him. Specifically, the request relates to the case where the film transmitted to him is to be run forward at twice the speed of the regular playback operation. Once this request has been received in the control unit 17, the control unit 17 instructs that hard disk 11 on which the desired programme is stored to read this programme at twice the speed from the hard disk 11. It also instructs the demultiplexer device 12 assigned to the hard disk to transfer the data of the corresponding programme or film to the data line 15 instead of to the previously assigned data line 13. The control unit 17 furthermore instructs the multiplexer device 16 to feed the corresponding data channel 15 on which the data read out at high speed are present to the decoding device 18. Furthermore, the control unit 17 instructs the decoding device 18 that it is to process the data present at twice the speed of regular playback operation. The two-fold increase in the operating speed of the decoding device 18 can be achieved, for example, by correspondingly increasing the clock frequency of this decoding device by a factor of 2. The control unit 17 additionally conveys another instruction to the subsampling unit 19. This instruction communicates to the subsampling unit 19 that it is to forward to the encoding device 21 in each case only every 2nd picture from the decoded video data present at its input. All the other video data that arise are suppressed. The control unit 17 uses a further instruction to communicate to the encoding device 21 that it must subsequently encode video data.

A further instruction of the control unit 17 is fed to the switching matrix. This instruction is used to communicate to the switching matrix 24 that it is now to take the data for the user who has requested the trick mode (fast forward run at twice the speed) from the data channel 23.

The double-speed read-out of the video data from the selected hard disk 11 requires that the hard disk and the corresponding data transmission line to the demultiplexer still have free data transmission capacity.

Figure 7:
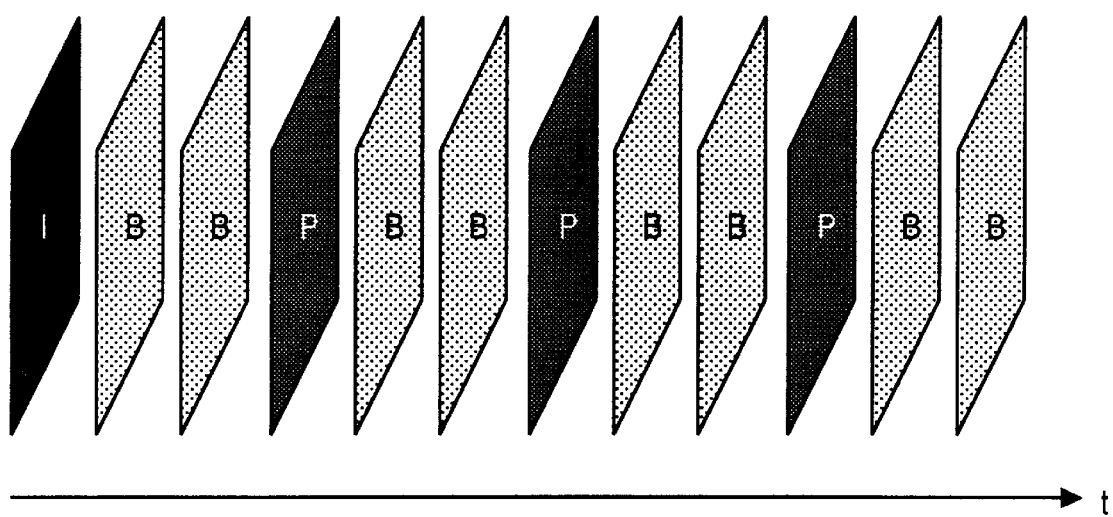
FIG. 7 shows a diagrammatic illustration of a sequence of differently coded pictures which is already known from the prior art.

The sequence of the video data read out at twice the speed from the corresponding hard disk 11 is illustrated in the upper part of FIG. 3. These video data are all decoded in the decoding device 18. As a result, decoded video data are present at the output of the decoding device 18. In each case identical volumes of data arise here per picture. In each case only every second picture is forwarded from the subsampling unit to the encoding device 21. The encoding device 21 only encodes the forwarded video data. This is carried out in accordance with the MPEG Standard. The sequence that appears at the output of the encoding device 21 is the same sequence of coded pictures as illustrated in FIG. 7. The sequence is illustrated in the lower part of FIG. 3.

Figure 4:
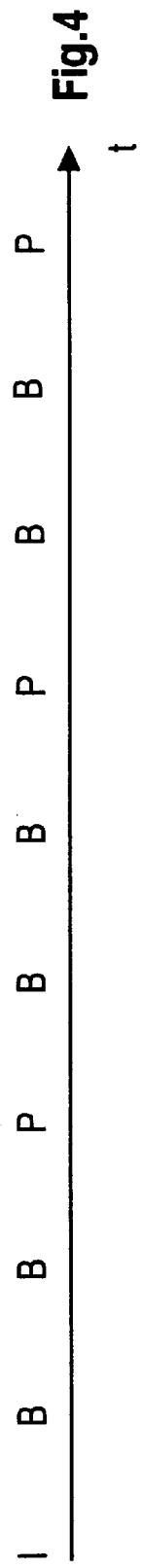
FIG. 4 shows a diagrammatic illustration for explaining the method according to the invention, in which a fast forward run at a playback speed which has been increased four-fold is illustrated.

FIG. 4 relates to the case where a user of the VOD service desires a fast forward run operation at four times the speed of the regular playback mode. The video data of the correspondingly selected programme are read from the hard disk at four times the speed. They are likewise decoded in the decoding device 18 at four times the speed. In the subsampling unit 21, only every 4th decoded picture is forwarded to the encoding unit 21. The encoding unit 21 encodes the pictures present once again at the regular playback speed. The resulting sequence of picture sequences is illustrated in the lower part of FIG. 4.

Figure 5:
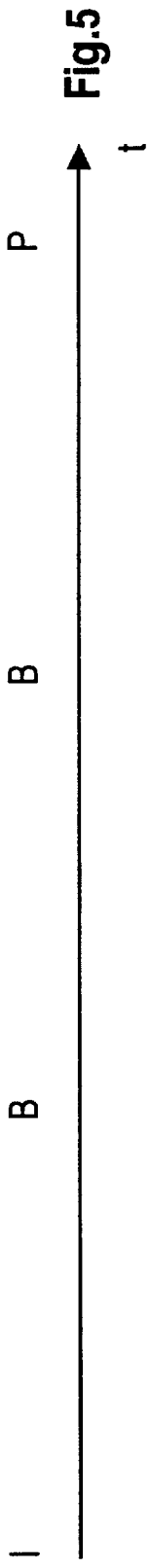
FIG. 5 shows a diagrammatic illustration for explaining the method according to the invention, in which a fast forward run at a playback speed which has been increased twelve-fold is illustrated.

FIG. 5 relates to the case where the user of a VOD service requests a forward run operation at twelve times the playback speed. In this case, the corresponding video data are read from the hard disk at twelve times the speed and are decoded at twelve times the speed by the decoding unit 18. In the subsampling unit 19, only every twelfth picture is selected and forwarded to the encoding device 21. The resulting sequence of pictures is likewise illustrated in the lower part of FIG. 5. Of course, the method described can also be employed with a different picture sequence from that illustrated in FIG. 7.

In order to realize the trick mode fast reverse run, a buffer 20 is provided in the subsampling unit 19. The fast reverse run at three times the playback speed of regular playback operation then functions as follows: on the precondition that the video data are stored on the hard disk with the picture sequence illustrated in FIG. 7. In the reverse run mode, the video data of 12 successive pictures are then always read out from the hard disk at three times the speed and are decoded at three times the speed by the decoding device 18. The decoded video data of all twelve successive pictures are then collected in the buffer 20. The video data of every third picture, starting from the end where the video data decoded last are, are then forwarded to the encoding device 21. Subsampling in reverse chronological order therefore takes place. The encoder 21 operates quite normally, as explained in the cases described previously.

Once the first 12 pictures have been processed, the chronologically preceding twelve pictures are read out from the hard disk, decoded and written to the buffer. In order to avoid a search operation in this case, pointers to the beginning of the preceding frame sequence should be stored on the hard disk in each case for a frame sequence.

This frame sequence, too, is then subsampled again and has its order reversed. This then produces a fast reverse run at three times the playback speed. Of course, a fast reverse run at other playback speeds is also possible in the same way. Here, too, it holds true that the method can also be employed correspondingly with different picture sequences from that illustrated in FIG. 7.

Figure 2:
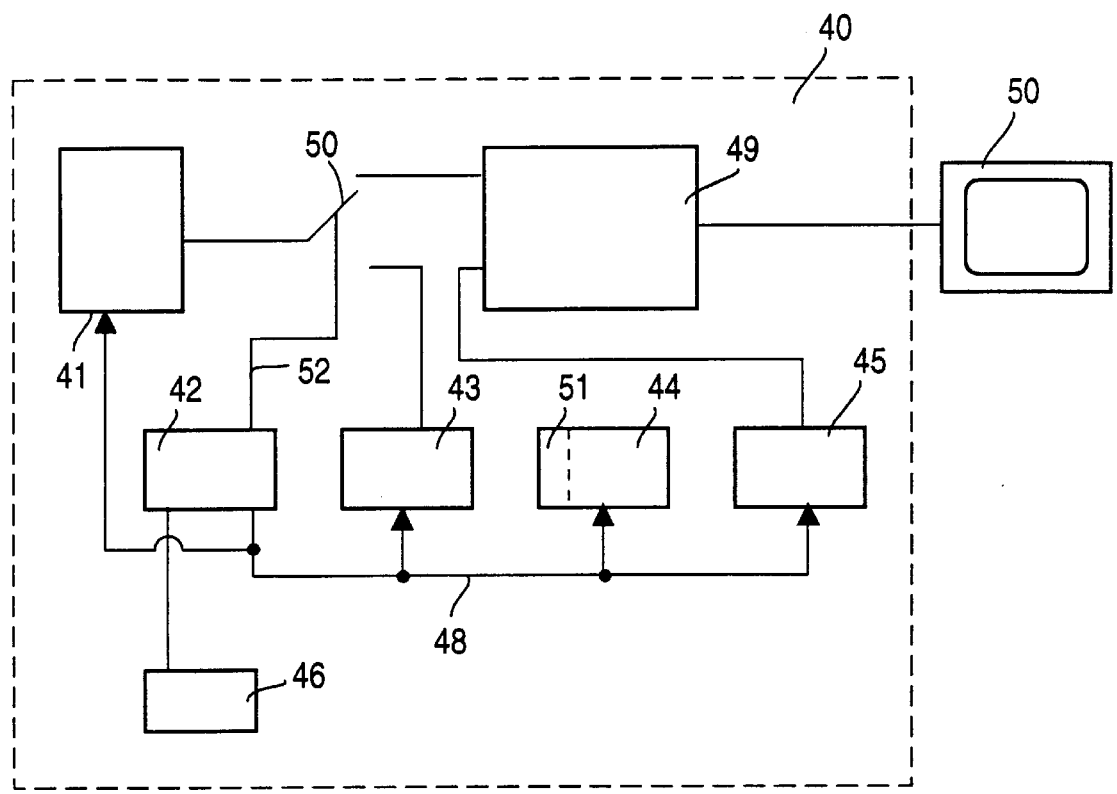
FIG. 2 shows a block diagram of a film playback device, such as, for example, a videodisk playback device.

FIG. 2 illustrates a second exemplary embodiment of the invention. In FIG. 2, the reference number 40 designates a film playback device. In this case, for example, it is a playback device for digital video disks. However, it may also be a digital video recorder or some other type of playback device for representing moving pictures, in which the video data are stored in coded form, for example in accordance with the MPEG Standard. The reference number 41 designates a storage unit. This may be a video disk, a magnetic tape, a holographic store, etc. The reference number 47 designates a switching unit. The reference number 42 designates a control unit. The reference number 43 designates a decoding device. The reference number 44 in turn designates a subsampling unit. A buffer 51 is provided in the subsampling unit 44. The reference number 45 once again designates an encoding device. The reference number 49 designates a video signal generator. The reference number 48 designates a control bus. The reference number 50 designates a conventional television set. The reference number 46 designates an input unit.

The functioning of the playback device is briefly explained below. The operator of the playback device can call up specific trick modes using the input unit 46. The case considered is that where he requests a fast forward run at six times the playback speed. The instruction of the operator is forwarded via the connecting line from the input unit 46 to the control unit 42. The control unit 42 passes a corresponding instruction via the control bus 48 to the storage unit 41, by means of which instruction it communicates to the storage unit that the data are subsequently to be read out at six times the speed. The control unit 42 communicates to the decoding device 43, likewise via the control bus 48, that data are subsequently to be decoded at six times the speed. The control unit 42 communicates to the subsampling unit 44 the instruction that in each case only the video data of every sixth decoded picture are to be forwarded to the encoding device 45.

The control unit 42 communicates to the encoding device 45 only a start instruction, so that the data present at the input are processed at the correct time. Finally, the control unit 42 passes an instruction via the separate control line 52 to the changeover unit 47, with the result that the data read out from the storage unit 41 are subsequently forwarded to the decoding device 43. The method of operation of the components 43, 44 and 45 corresponds to the method of operation of the previously explained components 18, 19 and 21 of the preceding exemplary embodiment. The method of operation of these components will not, therefore, be discussed in more detail once again.

The encoding device 45 can be matched to the specific requirements of the trick mode. Memory space can therefore be saved, for example, in that no bidirectionally coded pictures are produced and used in the encoded bit stream. Moreover, a simplification can be achieved by never transmitting relatively high DCT coefficients (DCT=Discrete Cosine Transform) in the trick mode.

The data present at the output of the encoding device 45 pass to the video signal generator 49. The latter converts the digital data into video signals which are then forwarded to the television set 50. A video signal generator of this type is sufficiently known from the prior art. It is necessary both in the exemplary embodiment according to FIG. 1 and in the exemplary embodiment according to FIG. 2 for the video data to be read from the storage unit at an increased speed. If a hard disk is involved, it is therefore necessary to keep a specific data transmission capacity free right from the outset, in order that a high forward run or reverse run speed can be achieved. Specifically, the maximum data transfer rate of the hard disk must not be exceeded.

In order to avoid this disadvantage, the methods described must be slightly modified. In this case, however, the option of offering any desired forward run or reverse run speeds is then relinquished. Only specific forward run speeds, namely the forward run speeds 3 and 12, for example, are then used. Specifically, the result of this is that in the case of the sequence of coded pictures which is illustrated in FIG. 7, only the intra-coded and unidirectionally coded pictures have to be read from the storage unit. As a result, then, the bidirectionally coded pictures lying in between do not even need to be transmitted.

In order to achieve this, it is necessary for a pointer, which points to the next unidirectionally coded or intra-coded picture, to be stored together with an intra-coded or unidirectionally coded picture. Correspondingly, for the reverse run at the speeds 3 and 12, it is necessary in each case to store a pointer which points to the preceding intra-coded or unidirectionally coded picture. The video data read out in this way can then be forwarded as described to the decoding device 18. Subsampling by the subsampling unit 19 is then no longer required, with the result that the latter may then be dispensed with. The decoding device 18 can then operate at normal speed, as also in the case of regular playback operation. The decoded pictures are forwarded directly to the encoding unit 21, which then likewise operates as described. The decoding and subsequent encoding are, however, likewise necessary then, in order that not just intra-coded pictures are transmitted to the switching matrix 21. Otherwise, for the reasons already explained above, an excessively large volume of data would be produced, which could not be transmitted via the channels 27 provided.

Figure 6:
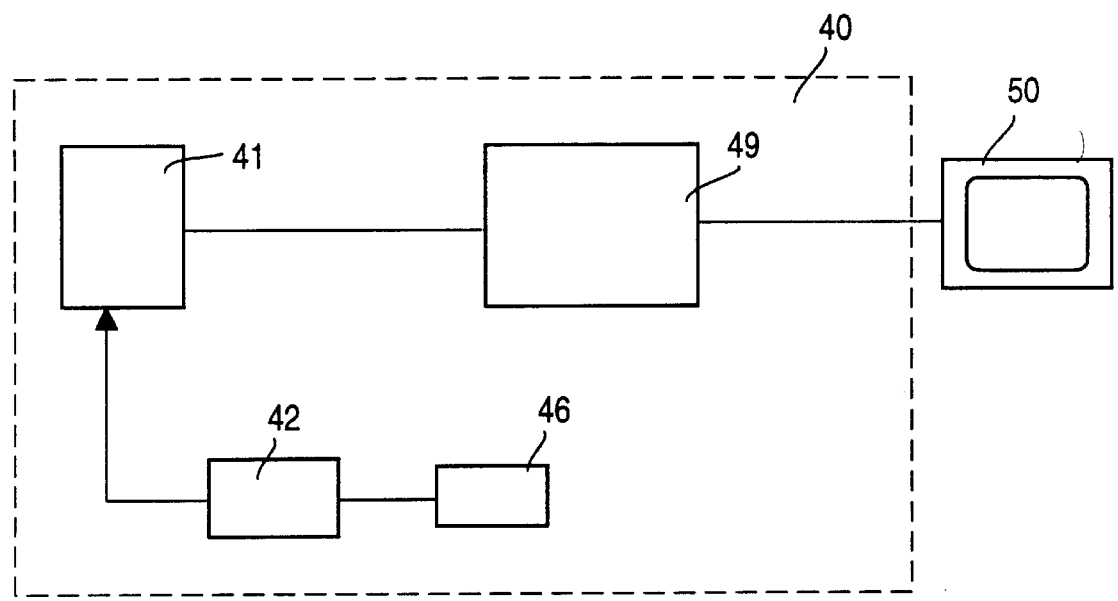
FIG. 6 shows a block diagram of a second exemplary embodiment of a film playback device.

However, greater simplifications then emerge for the case of a device according to the second exemplary embodiment. This is explained below with reference to FIG. 6. In FIG. 6, identical reference numbers designate the same as the corresponding reference numbers in FIG. 2. They are not, therefore, explained once again at this point. The simplification consists in that both the changeover unit 47, the decoding device 43, the subsampling unit 44 and the encoding device 45 can be omitted. In exchange, the transmission path from the storage unit 41 to the video signal generator 49 must be designed with a higher transport capacity. Specifically, it must be ensured that only intra-coded pictures can be transmitted via this transmission path.

The control unit 42 now emits only one corresponding instruction to the storage unit 41, by means of which instruction it causes the storage unit 41 to output only intra-coded pictures in the event of a fast forward or reverse run with the factor 12 or only intra-coded pictures and unidirectionally coded pictures in the event of a fast forward or reverse run with the factor 3.

A combination of the two methods described also lies within the scope of the invention. Therefore, in the case of a film playback device, it will be possible to employ the method explained first for the realization of lower forward run and reverse run speeds (for example 2-, 3- and 4-fold) and the method described second for higher forward run and reverse run speeds. In this case, only multiples of 3 or 12 (for example 6-, 9-, 12-, 24- and 36-fold) are then realized as higher forward run and reverse run speeds.

The transmission of the data to the decoder 25 and to the television set 50 can take place via satellite, terrestrially or conducted by cables. Of course, the data could also be transmitted to a video recorder or the like instead of to a television set.

In principle, the method can also be used for a fast search for audio data, for example in a CD player. The audio data are then read from the storage medium at an increased speed, decoded at an increased speed, time-domain subsampled and fed to an encoder.

We claim:

1. Method for the production of picture sequences for a fast search operation in a film playback device, the video data for the individual pictures of the film being stored in a storage unit, characterized in that the video data of the pictures used for normal playback operation are read out from the storage unit at an increased speed corresponding to the fast search operation, in that the video data of the pictures are decoded at the increased speed in a decoder, in that only the video data of specific individual pictures are selected from the decoded video data and are fed to an encoder which operates at a regular speed corresponding to normal playback, and in that the video data encoded in this way are made available for the picture sequences of the fast search operation.

2. Method according to claim 1, wherein the video data of the pictures are read out from the storage unit at a speed which has been increased n-fold compared with the regular playback mode, n being a number, in particular a natural number, greater than or equal to 2, wherein the decoder is likewise operated at a speed which has been increased n-fold compared with the regular playback mode, and wherein the video data which have been decoded at an increased speed are reduced by time-domain subsampling by the factor n.

3. Method according to claim 2, wherein only the decoded video data of every nth picture are forwarded to the encoder in the event of subsampling by the factor n.

4. Method according to claim 1 wherein the video data are coded and decoded in accordance with the MPEG1 or MPEG2 Standard.

5. Apparatus for reproduction of video data representative of individual pictures of a film in a fast search mode having a storage unit and a decoder for decoding video data stored in the storage unit, characterized in that means are provided which read out the video data used for normal playback mode at a speed n times that of the normal playback speed, n being a number, in particular a natural number, greater than or equal to 2, in that furthermore a decoder is provided which decodes the read-out video data at the n-fold speed, in that furthermore a subsampling unit is provided which selects from the decoded video data only those of every nth picture, and in that furthermore an encoder is provided which encodes the video data of the selected pictures at a regular speed corresponding to the normal playback mode.

6. Apparatus according to claim 5, comprising a buffer which in each case receives the decoded video data of a specific number of pictures, and wherein means are provided which, starting from the last decoded picture, make available to the encoder the video data of every nth picture in reverse chronological order.

7. Method for the production of picture sequences for a fast search operation in a film playback device, the video data for the individual pictures of the film being stored in a storage unit, characterized in that in a fast reverse run the video data of the pictures are read out from the storage unit at a speed which is increased compared with a regular playback operation, in that the video data of the pictures are decoded at an increased speed in a decoder and a specific number of decoded pictures are buffered and subsampled backwards and only the video data of specific individual pictures are selected from the decoded video data and fed to an encoder which operates at a regular speed, and in that the video data encoded in this way are made available for the picture sequences of the fast search operation.

8. Method according to claim 7, wherein the specific number of pictures relates to a sequence of 12 frames.

9. Method for the production of picture sequences for a fast search operation in a film playback device, the video data for the individual pictures of the film being stored in a storage unit, characterized in that in a fast reverse run the video data of the pictures are read out from the storage unit at a speed which is increased compared with a regular playback operation, in that the video data of the pictures are decoded at an increased speed in a decoder and a specific number of decoded pictures are buffered and subsampled backwards from the last decoded picture, and only the video data of specific individual pictures are selected from the decoded video data and fed to an encoder in reverse chronological order, the encoder operates at a regular speed, and in that the video data encoded in this way are made available for the picture sequences of the fast search operation.

* * * * *